United States Patent [19]
Moore et al.

[11] 3,787,959
[45] Jan. 29, 1974

[54] DIFFUSION WELDING IN AIR

[75] Inventors: Thomas J. Moore, Berea; Kenneth H. Holko, Strongsville, both of Ohio

[73] Assignee: The United States of America as represented by the Administrator of the National Aeronautics and Space Administration, Washington, D.C.

[22] Filed: Apr. 24, 1972

[21] Appl. No.: 247,090

[52] U.S. Cl............... 29/482, 29/488, 29/497, 29/498
[51] Int. Cl............................................ B23k 31/02
[58] Field of Search .. 29/488, 497, 497.5, 482, 498, 29/494, 486

[56] References Cited
UNITED STATES PATENTS

| | | | |
|---|---|---|---|
| 3,101,532 | 8/1963 | Christensen | 29/497 X |
| 3,195,229 | 7/1965 | Culver | 29/497 X |
| 3,235,957 | 2/1966 | Horsting | 29/497.5 X |
| 3,393,445 | 7/1968 | Ulam | 29/497.5 X |
| 3,400,449 | 9/1968 | Maguire et al. | 29/488 X |
| 3,468,016 | 9/1969 | Lorain et al. | 29/488 |

Primary Examiner—Richard B. Lazarus
Attorney, Agent, or Firm—N. T. Musial et al.

[57] ABSTRACT

Solid state welding a butt joint by fusion welding the peripheral surfaces to form a seal, autogenetically cleaning the faying or mating surfaces of the joint by heating the abutting surfaces to 1,200°C., and heating to the diffusion welding temperature in air.

8 Claims, 6 Drawing Figures

3,787,959

DIFFUSION WELDING IN AIR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention is concerned with solid state welding in air. The invention is particularly directed to diffusion welding without using a vacuum furnace or a hot press.

Fusion welding presently is widely used. In fusion welding the edges of the parts to be welded are melted. Various arc-welding methods are used to fusion weld steel plates. For fusion welding heavier sections, electroslag welding is preferred.

Diffusion welding has a number of technical advantages over fusion welding which involves melting of the parts. Chemical segregation and residual stresses are avoided with diffusion welding. Also parent metal properties and microstructure can be duplicated at the weld joint when diffusion welding is used.

Diffusion welding has not received wide usage because of the expense involved in the use of vacuum hot press equipment. Also, there is a severe size limitation placed on parts to be diffusion welded because of vacuum chamber size limitations.

SUMMARY OF THE INVENTION

These problems have been solved by the present invention wherein surfaces of parts to be welded are brought together at a butt joint. A seal weld is formed around the periphery of the butt joint, and autogenous faying surface cleaning is used. Diffusion welding is obtained by heating the assembly in air with deadweight loading.

OBJECTS OF THE INVENTION

It is, therefore, an object of the present invention to provide a method of solid state welding without deformation which can be used with thick sections.

Another object of the invention is to provide a method of welding which utilizes temperatures well below the melting temperature of the material being welded.

Another object of the invention is to provide a method of diffusion welding metal which does not require conventional vacuum hot press equipment.

These and other objects of the invention will be apparent from the specification which follows and from the drawing wherein like numerals are used throughout to identify like parts.

DESCRIPTION OF THE PREFERRED EMBODIMENT

Figure 1:
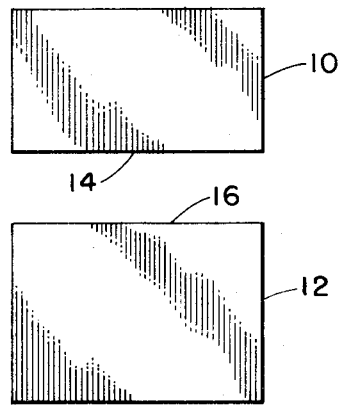
FIG. 1 is an elevation view showing two members which are to be solid state welded in accordance with the present invention.

Referring now to the drawing there is shown in FIG. 1 a pair of members 10 and 12 which are to be solid state welded together in accordance with the present invention. The member 10 has a surface 14 which faces a similar surface 16 on the member 12.

By way of example test plates 10 and 12 of AISI 1020 steel have been diffusion welded in accordance with the present invention. It is contemplated the invention can be modified for welding mild steel and stainless steel. Reactive and refractory metals that can dissolve in their own oxides can also be welded in accordance with the invention.

The process may be adapted for welding nickel-base alloys. It is further contemplated the process can be used for welding nonmetals, such as ceramic and glass.

Figure 4:
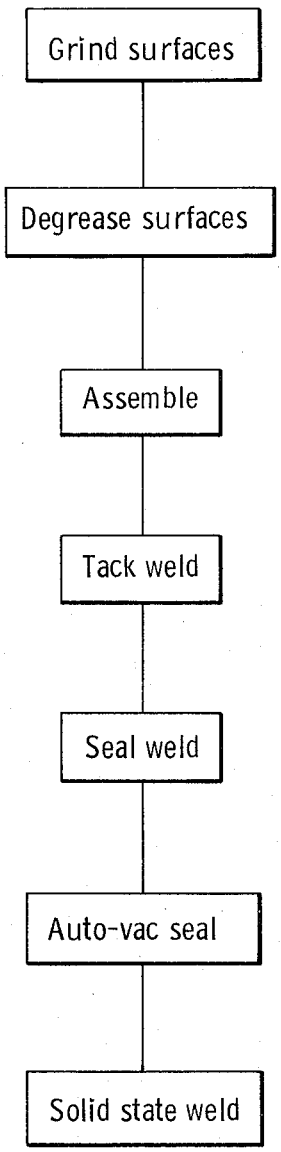
FIG. 4 is a flow sheet illustrating diagrammatically the preferred process for solid state welding in accordance with the present invention.

The surfaces 14 and 16 shown in FIG. 1 are prepared for welding as shown in the flow sheet of FIG. 4. Where the members 10 and 12 are metal the surfaces 14 and 16 are ground. By way of example, the surfaces 14 and 16 of the AISI 1020 steel plates were ground to about a $40.7 \times 10^{-6}$ cm rms (16 rms) finish. The finish ground surfaces were protected by applying a coating of oil.

Figure 2:
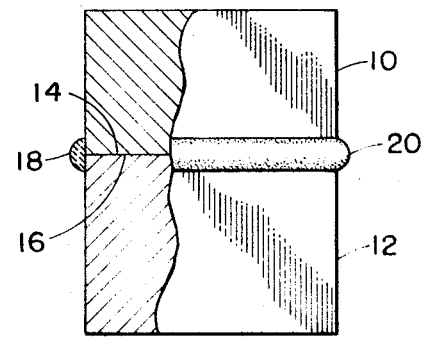
FIG. 2 is an elevation view partially in section showing the members assembled in preparation for welding in accordance with the invention.

The faying surfaces 14 and 16 are cleaned immediately prior to assembling the members 10 and 12 in the position as shown in FIG. 2. This cleaning is accomplished by wiping the surfaces with acetone and then alcohol. These solvents are particularly useful in removing grease.

The members 10 and 12 are then assembled in the position shown in FIG. 2. The faying surfaces 14 and 16 are in contact to form a butt joint. The members are held in the position shown in FIG. 2 with suitable clamps.

The members are tack welded at 18 and the clamps are removed. A seal weld 20 is formed on the periphery of the faying surfaces 14 and 16. By way of example, the SMA welding process was used successfully for both the tack welds and the seal welds. 3.2mm (1/8 inch) diameter AWS–E7018 covered electrodes were used. In the case of diffusion welding PH nickel-base materials, it is contemplated that the faying surfaces 14 and 16 would be cleaned and coated with a thin deposit of nickel or other suitable material prior to seal welding at the edges.

The faying surfaces 14 and 16 of the seal welded assembly shown in FIG. 2 are cleaned by the use of an autogenous or self-generated surface cleaning principle. This is designated as auto-vac cleaning and is used to reduce the effects of surface oxides that would normally hinder diffusion welding. During auto-vac cleaning the oxides and gases are dissolved in the parent metal.

In this procedure the seal welded assembly shown in FIG. 2 is placed in an air-atmosphere, resistance-heated furnace 22. The seal welded assembly is then heated to an elevated temperature for a time sufficient to clean the surfaces 14 and 16. The seal welded cleaned assembly is then cooled to ambient temperature within the furnace. By way of example, successful auto-vac cleaning was achieved by utilizing a temperature of 1,200°C for 2 ½ hours.

Figure 3:
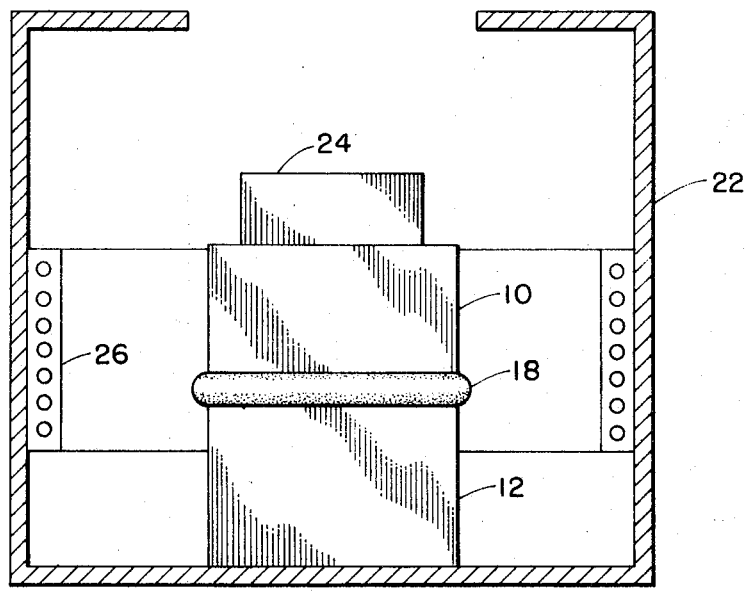
FIG. 3 is an elevation view of the assembled members being welded.

The cleaned seal welded assembly is again placed in the resistance-heated air-atmosphere furnace 22. A deadweight 24 is applied to the assembly as shown in FIG. 3. By way of example, a deadweight loading of about 5 psi was used with the aforementioned test samples. It is further contemplated that atmospheric pressure due to auto-vac cleaning could produce additional pressure on the joint.

The assembly of test plates was heated in the furnace 22 at three diffusion welding temperatures: 1,200°C, 1,090°C, and 980°C. Table I shows the mechanical properties of diffusion welds in the aforementioned specimens at these temperatures. The welding pressure for each test was $3.45 \times 10^4$ N/m² or 5 psi. The diffusion welding time for each specimen was two hours.

All weldments in Table I were double normalized at 900°C prior to testing. The tensile specimen axis and long side of the bend specimens were parallel to the short-transverse direction in the parent metal plate in the first weldment. They were parallel to the transverse direction in the parent metal plate in the other three weldments.

Figure 5:
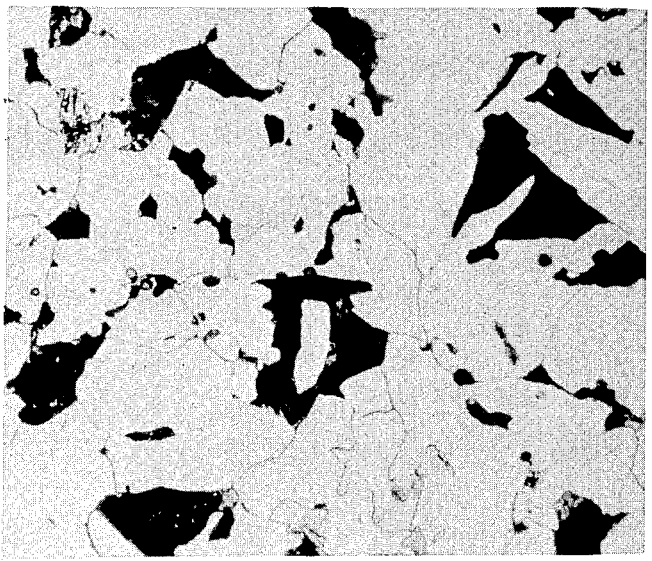
FIGS. 5 and 6 are X500 photomicrographs of diffusion welds made in accordance with the invention.

A study of Table I shows that with a seal weld at the joint periphery a sound, strong diffusion weld can be produced in air. This is illustrated by the bend data shown in the last column. For sealed assembly No. 1 diffusion welded at 1,200°C, preweld auto-vac cleaning was not necessary because both cleaning and diffusion welding took place in the two hour weld time at this temperature. FIG. 5 is a photomicrograph of this weld.

Figure 6:
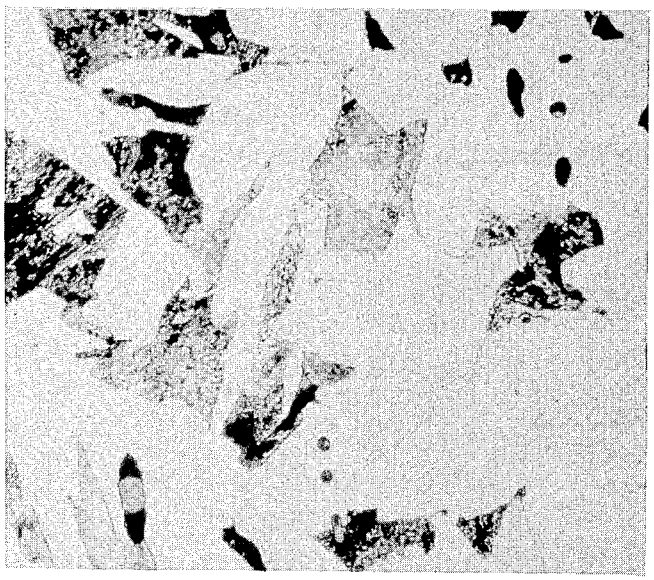

Sealed weldment No. 2 which was diffusion welded at 1,090°C with preweld auto-vac cleaning at 1,200°C, was successfully bent 180°. FIG. 6 is a photomicrograph of this weld. Weldment No. 3 which was also welded at 1,090°C but not auto-vac cleaned, failed the bend test at 5°. Thus pre-weld auto-vac cleaning plays a major role in subsequent 1,090°C diffusion welding.

Sealed weldment No. 4 had excellent tensile properties but failed the bend test at 45°. This indicates that the welding temperature of 980°C is not sufficiently high to produce full parent metal properties at the diffusion weld.

Cb, that serves to absorb gases. The getter, in the form of wire, is placed at the periphery of the weld joint under the seal weld.

What is claimed is:

1. A method of solid state welding a pair of members together in air comprising the steps of;
    forming substantially flat faying surfaces on said members,
    assembling said members together with said faying surfaces in contact,
    forming a seal weld about the periphery of said faying surfaces of said assembled members,
    cleaning said faying surfaces by heating said seal welded assembly to an elevated temperature of 1,200°C whereby gases and oxides between said faying surfaces are dissolved in said members, said seal weld preventing said air atmosphere from entering the space between said faying surfaces and whereby said cleaning is accomplished without applying any external pressure,
    applying pressure up to about 5 psi to said faying surfaces by deadweight loading, and
    diffusion welding said faying surfaces without macroscopic deformation by heating the cleaned seal weld assembly to an elevated temperature from 980°C to 1,200°C while applying said pressure.

2. A method of solid state welding as claimed in claim 1 wherein the faying surfaces are formed by grinding.

3. A method of solid state welding as claimed in claim 2 including the step of applying a coating of oil to the ground faying surfaces prior to assembly.

4. A method of solid state welding as claimed in claim 3 including the step of removing the oil coating immediately prior to assembly.

5. A method of solid state welding as claimed in claim 1 including the step of tack welding the assembled members at the periphery of said faying surfaces prior to seal welding.

6. A method of solid state welding as claimed in claim 1 wherein the faying surfaces of the seal welded assembly are cleaned by heating to 1,200°C for about 2 ½ hours.

TABLE I.—MECHANICAL PROPERTIES OF DIFFUSION WELDS IN AISI 1020 STEEL PLATE

| | Auto-vac cleaning temperature, °C | Diffusion welding temperature, °C | Tensile tests | | | | | | | |
|---|---|---|---|---|---|---|---|---|---|---|
| | | | Yield strength | | Tensile strength | | Elongation, percent | Reduction in area, percent | Fracture location | Guided bend |
| | | | MN/m² | ksi | MN/m² | ksi | | | | |
| 1 | None | 1200 | 310 | 44.9 | 495 | 71.8 | 20 | 30 | Parent metal | 180°. |
| | | | 304 | 44.1 | 503 | 72.9 | 22 | 33 | do | |
| 2 | 1200 | 1090 | 238 | 34.5 | 455 | 65.9 | 42 | 63 | do | 180°. |
| | | | 227 | 32.9 | 454 | 65.7 | 36 | 61 | do | |
| 3 | None | 1090 | 298 | 43.3 | 368 | 53.3 | 6 | 8 | Weld joint | Fracture at weld at 5°. |
| | | | | | 269 | 39.0 | 1 | 4 | do | |
| 4 | 1200 | 980 | 231 | 33.5 | 454 | 65.7 | 35 | 56 | Parent metal | Fracture at weld at 45°. |
| | | | 233 | 33.7 | 442 | 64.1 | 32 | 56 | do | |

While a preferred embodiment of the invention has been described it will be appreciated that various procedural modifications can be made on the disclosed method without departing from the spirit of the invention or the scope of the subjoined claims. For example, while the furnace 22 is heated by coils 26 it is contemplated that local heating by strip heaters or by inductors can be used. Another contemplated modification involves the use of a gettering material, such as Ti or 7. A method of solid state welding as claimed in claim 1 including the step of;
    cooling the seal welded assembly after cleaning and before diffusion welding.

8. A method of solid state welding as claimed in claim 7 wherein the faying surfaces are cleaned by heating to a temperature of about 1,200°C for about 2 ½ hours, and diffusion welded by heating to a temperature of about 1,090°C for about 2 hours.

* * * * *